UNITED STATES PATENT OFFICE.

WALTER BIRKETT HAMILTON, OF YORKSHIRE, ENGLAND.

MANUFACTURE OF GRAY CAST-IRON.

1,296,384.  Specification of Letters Patent.  Patented Mar. 4, 1919.

No Drawing. Application filed December 20, 1917. Serial No. 208,071.

*To all whom it may concern:*

Be it known that I, WALTER BIRKETT HAMILTON, a subject of the King of Great Britain, residing in Yorkshire, England, have invented certain new and useful Improvements in the Manufacture of Gray Cast-Iron, of which the following is a specification.

The invention relates to the manufacture of gray cast-iron in an electric furnace, According to the invention, iron or steel is introduced either in the molten or solid state into an electric furnace provided with a silica or other acid lining. The furnace may be of any known suitable type, such as Heroult's, Fricke's, Graves-Etchells'.

Limestone, lime or other metallic oxid is added with sand or other form of silica, such as quartz, sandstone silicates, etc., to form a slag or flux on the surface of the molten iron.

Carbon, coke or coal is added, and it is immaterial whether this addition is made when the metal is charged into the furnace, or during or after the process of melting, or to the surface of the slag or flux. The carbonaceous material reduces silicon from the slag or flux and the reduced silicon combines with the molten metal from which graphite separates and gives to the metal when cold a gray open texture.

If the iron or steel is charged in the solid state, the addition of carbonaceous material will assist the process of melting.

Having thus described the nature of the said invention and the best means I know of carrying the same into practical effect, I claim:—

1. The manufacture of gray cast iron in an electric furnace by first lining the furnace with an acid lining, then charging into the furnace metallic iron and carbon and adding a basic material and silica to form a slag on the surface of the molten iron.

2. The manufacture of gray cast iron in an electric furnace by first lining the furnace with an an acid lining, then charging into the furnace metallic iron, then adding carbon to the molten metal and adding a basic material and silica to form a slag on the surface of the molten metal.

3. The manufacture of gray cast iron in an electric furnace by first lining the furnace with an acid lining, then charging into the furnace metallic iron, then adding a basic material and silica to form a slag on the surface of the molten metal and charging carbon on to the said slag.

In testimony whereof I have signed my name to this specification in the presence of two subscribing witnesses.

WALTER BIRKETT HAMILTON.

Witnesses:
B. M. DERHAM,
WALTER I. SKERTEN.

Copies of this patent may be obtained for five cents each, by addressing the "Commissioner of Patents, Washington, D. C."